United States Patent [19]

Reddy

[11] Patent Number: 5,009,807

[45] Date of Patent: * Apr. 23, 1991

[54] NIOBIUM-ACTIVATED YTTRIUM TANTALATE X-RAY PHOSPHOR WITH IMPROVED BRIGHTNESS AND METHOD OF MAKING SAME

[75] Inventor: V. Butchi Reddy, Sayre, Pa.

[73] Assignee: GTE Products Corporation, Stamford, Conn.

[ * ] Notice: The portion of the term of this patent subsequent to Nov. 13, 2007 has been disclaimed.

[21] Appl. No.: 563,133

[22] Filed: Aug. 6, 1990

Related U.S. Application Data

[63] Continuation-in-part of Ser. No. 459,891, Jan. 2, 1990, Pat. No. 4,970,024.

[51] Int. Cl.$^5$ ............................................. C09K 11/78
[52] U.S. Cl. ..................... 252/301.4 H; 252/301.4 R
[58] Field of Search .................. 252/301.4 R, 301.4 H

[56] References Cited

U.S. PATENT DOCUMENTS

| | | | |
|---|---|---|---|
| 3,758,486 | 9/1973 | Ropp | 252/301.4 R |
| 4,024,069 | 5/1977 | Larach | 252/301.4 R |
| 4,225,653 | 9/1980 | Brixner | 428/539 |
| 4,387,141 | 6/1983 | Patten | 428/690 |

FOREIGN PATENT DOCUMENTS

| | | | |
|---|---|---|---|
| 49-34311 | 9/1974 | Japan | 252/301.4 R |
| 61-98787 | 5/1986 | Japan | 252/301.4 R |

OTHER PUBLICATIONS

Brixner et al "J. Electrochem. Soc." 130(12), 1983, pp. 2435–2443.

*Primary Examiner*—Jack Cooper
*Attorney, Agent, or Firm*—Elizabeth A. Levy

[57] ABSTRACT

A niobium-activated yttrium trantalate x-ray phosphor which incorporates small molar amounts of a rubidium or cesium halide, a strontium or barium halide, and, optionally, a gallium or aluminum oxide, to effect improved brightness.

5 Claims, No Drawings

NIOBIUM-ACTIVATED YTTRIUM TANTALATE X-RAY PHOSPHOR WITH IMPROVED BRIGHTNESS AND METHOD OF MAKING SAME

This application is a continuation-in-part of copending U.S. patent application Ser. No. 07/459,891, filed 10/02/90, now U.S. Pat. No. 4,970,024, entitled "Niobium-Activated Yttrium Tantalate X-Ray Phosphor with Improved Brightness and Method of Making Same" by V. B. Reddy.

TECHNICAL FIELD

This invention relates to the manufacture of niobium-activated yttrium tantalate x-ray phosphors.

BACKGROUND ART

Such phosphors are disclosed in U.S. Pat. Nos. 4,225,653 and 4,387,141. In both patents the phosphor composition has the formula $YNb_xTa_{1-x}O_4$, where x is 0 to about 0.15.

It has been discovered that phosphor brightness can be improved by the addition of small molar amounts of a halide of rubidium, cesium, strontium, or barium, and, optionally, an oxide of gallium or aluminum.

SUMMARY OF THE INVENTION

It is an object of the invention to provide a niobium-activated yttrium tantalate x-ray phosphor with improved brightness.

This object is accomplished, in one aspect of the invention, by a phosphor made by forming a uniform mixture of the following ingredients in the following proportions: one mole of yttrium oxide, 0.995 mole of tantalum oxide, 0.005 mole of niobium oxide, from 0.001 mole to 0.01 mole of a halide of rubidium or cesium, from 0.01 mole 0.10 mole of a halide of strontium or barium, and, optionally, from 0.01 mole to 0.04 mole of an oxide of gallium or aluminum, blending this mixture with a lithium chloride-lithium sulfate eutectic flux, and firing the mixture at about 1200°–1300° C. (2192°–2372° F.) for about 10–12 hours.

The following non-limilting examples are presented.

EXAMPLE 1

(Control)

One mole of yttrium oxide, $Y_2O_3$, 0.995 mole of tantalum oxide, $Ta_2O_5$, and 0.005 mole of niobium oxide, $Nb_2O_5$, were weighed and blended together to form a phosphor composition of $YTa_{0.995}Nb_{0.005}O_4$. The molar concentration of niobium activator was 0.005 mole. A flux of lithium chloride in an amount of 33 weight percent was added to the mixture and blended using standard blending procedures. The blend was loaded into an alumina crucible and fired in an electric furance for about 10 to 12 hours at about 12000°–1300° C. (2192°–2372° F.). The fired material was cooled in the furnace and the flux material leached out with deionized water washings. The flux-free material was then filtered, dried and classified. The sample was then measured for luminescence efficiency under x-ray excitation. This sample was the control for the following examples and the brightness value was normalized at 100.

EXAMPLE 2

The procedure of Example 1 was followed using a eutectic flux mixture of lithium chloride and lithium sulfate, $(LiCl)_2$—$Li_2SO_4$ (46.5:53.5 mole percent, respectively), in an amount of 33 weight percent of the phosphor raw material. The eutectic temperature of this flux composition is about 478° C. (892° F.). This sample was 8% brighter than the control.

EXAMPLE 3

The procedure of Example 1 was followed, with the addition of 0.01 mole of strontium fluoride, 0.001 mole of rubidium chloride, and 0.01 mole of gallium oxide as dopants. A lithium chloride-lithium sulfate eutectic flux mixture, 33 weigth percent, was used. This sample was 22% brighter than the control.

EXAMPLE 4

The procedure of Example 3 was repeated to determine reproducibility of the results. This sample was 20% brighter than the control.

EXAMPLE 5

The procedure of Example 3 was used, except that instead of 0.01 mole of gallium oxide, 0.01 mole of aluminum oxide was used. This sample was 16% brighter than the control.

EXAMPLE 6

The procedure of Example 5 was repeated to determine the reproducibility of the results. This sample was 18% brighter than the control.

EXAMPLE 7

The procedure of Example 3 was used, except that no gallium oxide was used. This sample was 12% brighter than the control.

X-ray optical fluorescence (XOF) brightness data for the examples are given in Table I.

TABLE I

| | YTaO4:Nb PHOSPHOR BRIGHTNESS DATA | | | | | |
|---|---|---|---|---|---|---|
| | | DOPANT CONCENTRATION, MOLES | | | | XOF |
| NO. | FLUX | $SrF_2$ | RbCl | $Ga_2O_3$ | $Al_2O_3$ | BRIGHTNESS |
| 1 | LiCl | — | — | — | — | 100 |
| 2 | $(LiCl)_2$—$Li_2SO_4$ | — | — | — | — | 108 |
| 3 | $(LiCl)_2$—$Li_2SO_4$ | 0.01 | 0.001 | 0.01 | — | 122 |
| 4 | $(LiCl)_2$—$Li_2SO_4$ | 0.01 | 0.001 | 0.01 | — | 120 |
| 5 | $(LiCl)_2$—$Li_2SO_4$ | 0.01 | 0.001 | — | 0.01 | 116 |
| 6 | $(LiCl)_2$—$Li_2SO_4$ | 0.01 | 0.001 | — | 0.01 | 118 |
| 7 | $(LiCl_2$—$Li_2SO_4)$ | 0.01 | 0.001 | — | — | 112 |

While there has been shown and described what are at present considered the preferred embodiments of the invention, it will be obvious to those skilled in the art that various changes and modifications may be made therein without departing from the scope of the invention as defined by the appended claims.

What is claimed is:

1. A niobium-activated yttrium tantalate x-ray phosphor containing rubidium halide or cesium halide, strontium halide or barium halide and, optionally, gallium oxide or aluminum oxide incorporated therein, made by forming a uniform mixture of the following ingredients in the following proportions:
   one mole of yttrium oxide;
   0.995 mole of tantalum oxide;
   0.005 mole of niobium oxide;
   from 0.001 mole to 0.01 mole of rubidium halide or cesium halide;
   from 0.01 mole to 0.10 mole of strontium halide or barium halide;
   and, optionally, from 0.01 mole to 0.04 mole of gallium oxide or aluminum oxide;
   blending said mixture with a lithium chloride-lithium sulfate eutectic flux composition;
   firing said mixture at about 1200°-1300° C. for about 10-12 hours to form said phosphor;
   washing said phosphor in deionized water to remove said flux; and
   filtering, drying and classifying said phosphor, said phosphor exhibiting a higher brightness than the phosphor prepared as above absent rubidium halide, cesium halide, strontium halide, barium halide, gallium oxide and aluminum oxide.

2. The phosphor of claim 1 wherein said halide is selected from the group consisting of chloride, fluoride, and bromide.

3. The phosphor of claim 1 wherein said eutectic flux composition comprises about 33 weight percent of said mixture.

4. A method of making a niobium-activated yttrium-tantalate x-ray phosphor, comprising the steps of:
   forming a uniform mixture of the following ingredients in the following proportions: one mole of yttrium oxide, 0.995 mole of tantalum oxide, 0.005 mole of niobium oxide, from 0.001 mole to 0.01 mole of cesium halide or rubidium halide, from 0.01 mole to 0.10 mole of strontium halide or barium halide, and, optionally, from 0.01 mole to 0.04 mole of gallium oxide or aluminum oxide;
   blending said mixture with a lithium chloride-lithium sulfatre eutectic flux composition; and
   firing said mixture at about 1200°-1300° C. for about 10-12 hours to form said phosphor;
   washing said phosphor in deionized water to remove said flux; and
   filtering, drying and classifying said phosphor, said phosphor exhibiting a higher brightness than the phosphor prepared as above absent rubidium halide, cesium halide, strontium halide, barium halide, gallium oxide and aluminum oxide.

5. The method of claim 4 wherein said eutectic flux composition comprises about 33 weight percent of said mixture.

* * * * *